United States Patent
Wang et al.

(10) Patent No.: US 9,889,577 B2
(45) Date of Patent: Feb. 13, 2018

(54) WASTE RECYCLING MECHANISM AND FILM CUTTING MODULE THEREOF

(71) Applicants: Interface Optoelectronics (Shenzhen) Co., Ltd., Shenzhen, Guangdong (CN); GENERAL INTERFACE SOLUTION LIMITED, Miaoli County (TW)

(72) Inventors: Gang Wang, Rizhao (CN); Jung-Hung Kuo, Pingtung County (TW); Yunhui Huang, Shenzhen (CN); Anpu Zhu, Jian (CN)

(73) Assignees: INTERFACE OPTOELECTRONICS (SHENZHEN) CO., LTD., Shenzhen, Guangdong (CN); GENERAL INTERFACE SOLUTION LIMITED, Miaoli County (TW)

( * ) Notice: Subject to any disclaimer, the term of this patent is extended or adjusted under 35 U.S.C. 154(b) by 653 days.

(21) Appl. No.: 14/555,582

(22) Filed: Nov. 27, 2014

(65) Prior Publication Data

US 2015/0082959 A1    Mar. 26, 2015

(30) Foreign Application Priority Data

Nov. 19, 2014    (CN) .......................... 2014 1 0665537

(51) Int. Cl.
*B26D 7/18* (2006.01)
*B65H 35/02* (2006.01)
*B26F 1/38* (2006.01)

(52) U.S. Cl.
CPC .............. *B26D 7/1836* (2013.01); *B26F 1/38* (2013.01); *Y02P 70/183* (2015.11); *Y10T 83/2074* (2015.04)

(58) Field of Classification Search
CPC ....... B26D 7/18; B26D 7/1836; Y02P 70/183; B26F 1/38; Y10T 83/2074
See application file for complete search history.

(56) References Cited

U.S. PATENT DOCUMENTS

| 5,108,358 A | * | 4/1992 | Mounce | ............... B26D 7/1836 15/77 |
| 2011/0185870 A1 | * | 8/2011 | Yu | ......................... B26D 7/0625 83/174 |
| 2012/0297944 A1 | * | 11/2012 | Maddaleni | ............... B26D 3/16 83/23 |

(Continued)

*Primary Examiner* — William A. Rivera
(74) *Attorney, Agent, or Firm* — Locke Lord LLP; Tim Tingkang Xia, Esq.

(57) ABSTRACT

A waste recycling mechanism is disposed on a film cutting machine and includes a fixing plate fixed to a cutting template of the film cutting machine, a pressing-head device disposed on the fixing plate, a tape, a tape reel and a collection device disposed on a platform of the film cutting machine. The tape is wound on the tape reel and is connected to the collection device after being wound on the pressing-head device. When the fixing plate moves downward with a cutting motion of the cutting template, the pressing-head device presses a film waste to make the tape attached to the film waste. When the fixing plate moves upward, the collection device reels in the tape to make a portion of the tape having the film waste separate from the pressing-head device and make a portion of the tape without any film waste wound on the pressing-head device.

18 Claims, 5 Drawing Sheets

(56) References Cited

U.S. PATENT DOCUMENTS

2015/0082959 A1\* 3/2015 Wang .................. B26D 7/1836
  83/102
2015/0270034 A1\* 9/2015 Wabnegger .......... H01B 15/006
  241/25

\* cited by examiner

WASTE RECYCLING MECHANISM AND FILM CUTTING MODULE THEREOF

BACKGROUND OF THE INVENTION

1. Field of the Invention

The present invention relates to a waste recycling mechanism and a film cutting module thereof, and more specifically, to a waste recycling mechanism utilizing a pressing-head device having a tape wound thereon to move upward and downward with a cutting motion of a cutting template of a film cutting machine for removing a film waste and a film cutting machine thereof.

2. Description of the Prior Art

In general, film wastes usually remain on a protection film after the protection film is cut by a film cutting machine. A conventional recycling method is to attach tapes to two sides of the protection film. Accordingly, film wastes formed at the two sides of the protection film after the protection film is cut could be removed by a tape tearing-off process in an automated manner. However, the aforesaid method could only remove the film wastes formed at the two sides of the protection film. That is, if there are film wastes formed on other positions of the protection film, the aforesaid tape tearing-off process needs to be performed manually for removing the film wastes, so as to cause a time-consuming and strenuous waste recycling process and generate the problem that the protection film could be torn apart by accident or tape marks could be formed on the protection film during the aforesaid tape tearing-off process. Accordingly, the cutting efficiency and quality of the film cutting machine is influenced.

SUMMARY OF THE INVENTION

The present invention provides a waste recycling mechanism disposed on a film cutting machine for performing a waste recycling operation of the film cutting machine. The film cutting machine includes a cutting template and a platform. The cutting template is movably disposed on the platform for moving upward and downward relative to the platform and performing a cutting motion. The waste recycling mechanism includes a fixing plate, at least one pressing-head device, a tape reel, a collection device, and a tape. The fixing plate is fixed on the cutting template for moving upward and downward with the cutting motion of the cutting template. The at least one pressing-head device is disposed on the fixing plate. The tape reel is disposed on the platform. The collection device is disposed on the platform. The tape is wound on the tape reel and is connected to the collection device after being wound on the at least one pressing-head device. When the fixing plate moves downward with the cutting motion of the cutting template, the at least one pressing-head device moves downward to press a film waste on a film for making the tape attached to the film waste. When the fixing plate moves upward with the cutting motion of the cutting template, the at least one pressing-head device moving upward to separate the film waste attached to the tape from the film and the collection device reels in the tape to make a portion of the tape having the film waste attached thereto separate from the at least one pressing-head device and make a portion of the tape without any film waste wound on the pressing-head device.

The present invention further provides a film cutting module including a film cutting machine and a waste recycling mechanism. The film cutting machine includes a platform and a cutting template. The cutting template is movably disposed on the platform for moving upward and downward relative to the platform and performing a cutting motion. The waste recycling mechanism is disposed on the film cutting machine. The waste recycling mechanism includes a fixing plate, at least one pressing-head device, a tape reel, a collection device, and a tape. The fixing plate is fixed on the cutting template for moving upward and downward with the cutting motion of the cutting template. The at least one pressing-head device is disposed on the fixing plate. The tape reel is disposed on the platform. The collection device is disposed on the platform. The tape is wound on the tape reel and is connected to the collection device after being wound on the at least one pressing-head device. When the fixing plate moves downward with the cutting motion of the cutting template, the at least one pressing-head device moves downward to press a film waste on a film for making the tape attached to the film waste. When the fixing plate moves upward with the cutting motion of the cutting template, the at least one pressing-head device moving upward to separate the film waste attached to the tape from the film and the collection device reels in the tape to make a portion of the tape having the film waste attached thereto separate from the at least one pressing-head device and make a portion of the tape without any film waste wound on the pressing-head device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
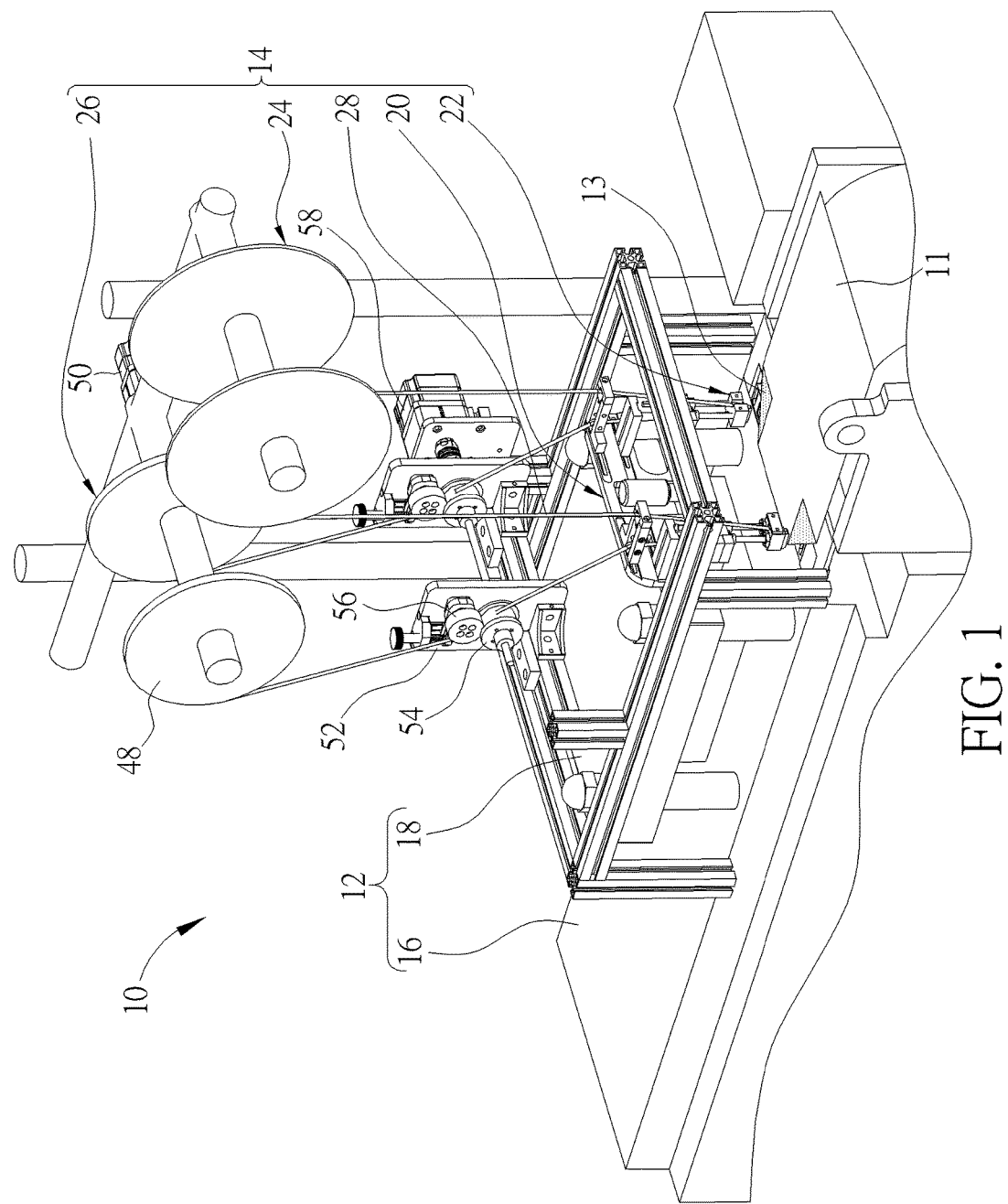
FIG. 1 is a partial diagram of a film cutting module according to an embodiment of the present invention.

Please refer to FIG. 1, which is a partial diagram of a film cutting module 10 according to an embodiment of the present invention. As shown in FIG. 1, the film cutting module 10 includes a film cutting machine 12 and a waste recycling mechanism 14. The film cutting machine 12 could be a conventional film cutting apparatus for cutting a protection film. The film cutting machine 12 includes a platform 16 and a cutting template 18. The cutting template 18 is movably disposed on the platform 16 for moving upward and downward relative to the platform 16 and performing a cutting motion, so that a protection film could be cut to a desired shape by the cutting template 18. As for the mechanical design of the film cutting machine 12, its related description is omitted herein since it is commonly seen in the prior art.

More detailed description for the mechanical design of the waste recycling mechanism 14 is provided as follows.

Figure 2:
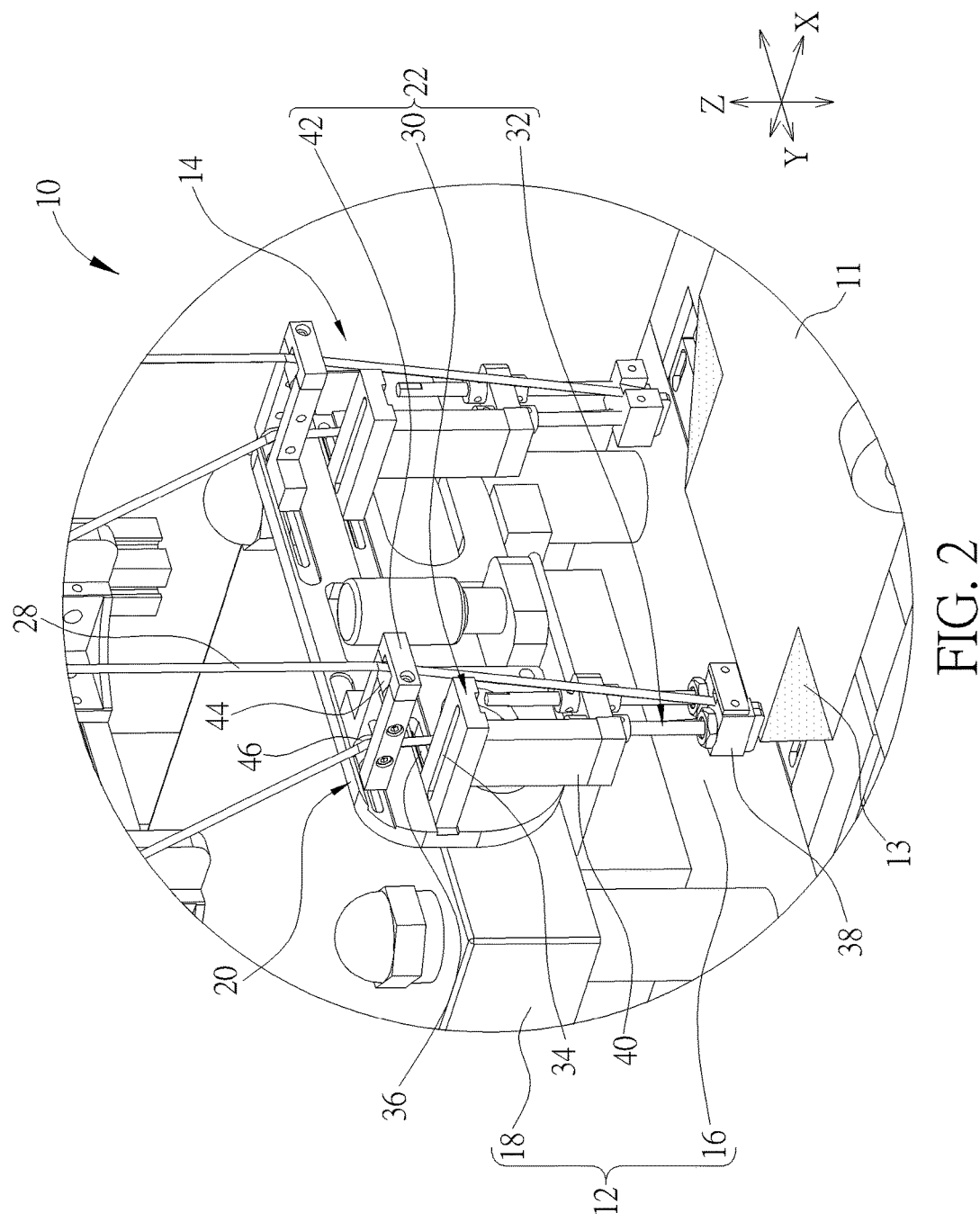
FIG. 2 is a partial enlarged diagram of the film cutting module in FIG. 1.

Please refer to FIG. 1 and FIG. 2. FIG. 2 is a partial enlarged diagram of the film cutting module 10 in FIG. 1. As shown in FIG. 1 and FIG. 2, the waste recycling mechanism 14 is disposed on the film cutting machine 12 and includes a fixing plate 20, at least one pressing-head device 22 (two shown in FIG. 2, but not limited thereto), a tape reel 24, a collection device 26, and a tape 28. The fixing plate 20 is fixed on the cutting template 18 for moving upward and downward with the cutting motion of the cutting template 18. The pressing-head device 22 is disposed on the fixing plate 20. In this embodiment, the pressing-head device 22 could be movable on the fixing plate 20 in two axes, but not limited thereto, meaning that, for example, the pressing-head device 22 could also be fixed on the fixing plate 20 or be movable relative to the fixing plate 20 in one axis. As for which design is utilized, it depends on the practical application of the film cutting module 10. As shown in FIG. 2, the pressing-head device 22 could include a slot arm portion 30 and a pressing-head arm portion 32. The slot arm portion 30 protrudes from the fixing plate 20 and has a first guide slot 34. The fixing plate 20 has a second guide slot 36. The pressing-head arm portion 32 has a pressing-head end 38 and a block end 40. The pressing-head end 38 could be preferably made of silicone rubber material for preventing damage of a protection film due to pressing of the pressing-head end 38 on a film waste or preventing tape marks on the protection film. In this embodiment, the block end 40 is movably inserted into the first guide slot 34 for moving along the first guide slot 34 in a first direction (i.e. an X-axis direction in FIG. 2). The slot arm portion 30 is movably inserted into the second guide slot 36 for moving along the second guide slot 36 in a second direction (i.e. a Y-axis direction in FIG. 2). In such a manner, via the aforesaid biaxial moving design, the pressing-head device 22 could move to make the pressing-head end 38 aligned with a film waste, so as to achieve the purpose that the pressing-head device 22 could press the film waste precisely. Furthermore, the pressing-head device 22 could further include a guide pulley frame 42. The guide pulley frame 42 could protrude from the fixing plate 20 and has a first pulley portion 44 and a second pulley portion 46 for guiding the tape 28 to pass through the first pulley portion 44 to be wound on the pressing-head end 38 and then pass through the second pulley portion 46 to be connected to the collection device 26.

The tape reel 24 is disposed on the platform 16 for the tape 28 to be wound thereon. The collection device 26 is disposed on the platform 16 for reeling in the tape 28. In this embodiment, the collection device 26 could include a reeling plate 48 and a first motor 50. The reeling plate 48 is connected to the tape 28. The first motor 50 is axially pivoted to the reeling plate 48 for rotating the reeling plate 48 so as to reeling in a portion of the tape 28 having a film waste attached thereto. The first motor 50 could be preferably a torque motor, but not limited thereto. In practical application, for achieving the purpose that the reeling plate 48 could reel in the tape 28 more smoothly and the reeling speed of the collection device 26 could be adjustable flexibly, the collection device 26 could further include a board 52, a driving pulley 54, a driven pulley 56, and a second motor 58. The second motor 58 could be preferably an adjustable speed motor, but not limited thereto. The driving pulley 54 is rotatably disposed on the board 52. The driven pulley 56 is rotatably disposed on the board 52 for clamping the tape 28 cooperatively with the driving pulley 54. The second motor 58 is axially pivoted to the driving pulley 54. Accordingly, the second motor 58 could be used for rotating the driving pulley 54 to make the driving pulley 54 drive the driven pulley 56 to rotate, so that the driving pulley 54 could reel in the tape 28 cooperatively with the driven pulley 56. In such a manner, the portion of the tape having the film waste attached thereto could move toward the reeling plate 48 accordingly.

Figure 3:
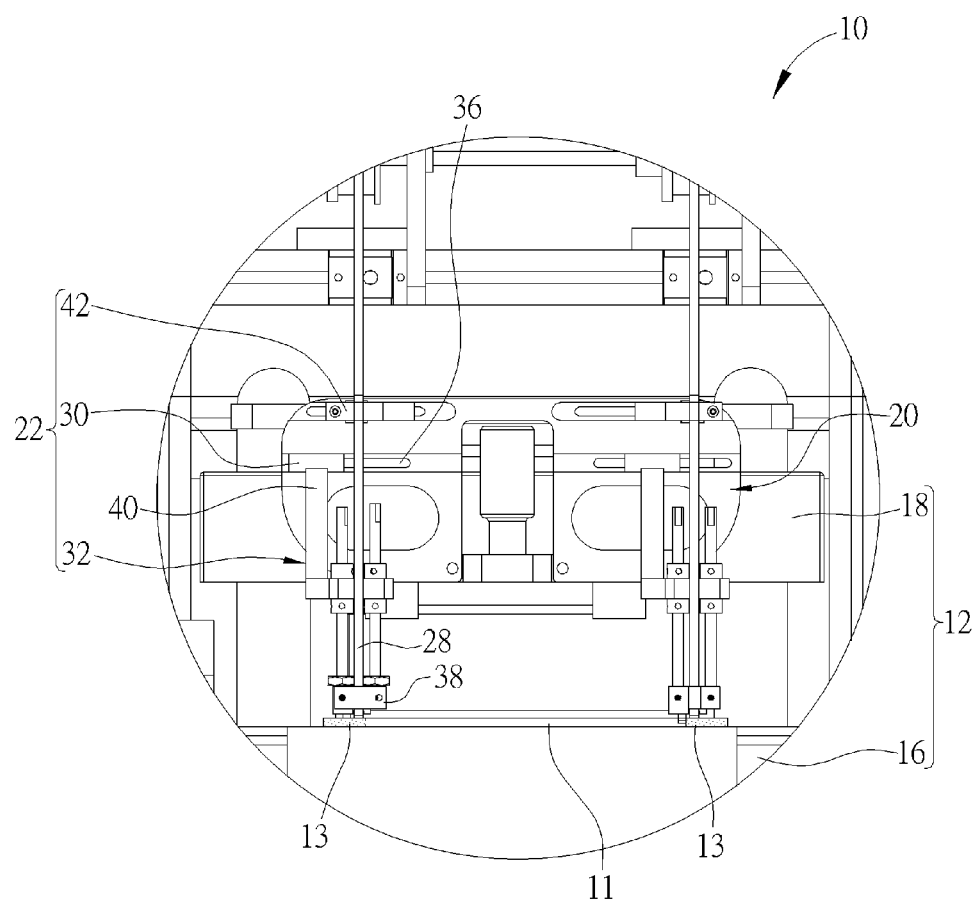
FIG. 3 is a partial enlarged diagram of the film cutting module in FIG. 1 when a pressing-head end of a pressing-head device presses a film waste of a protection film.
Figure 4:
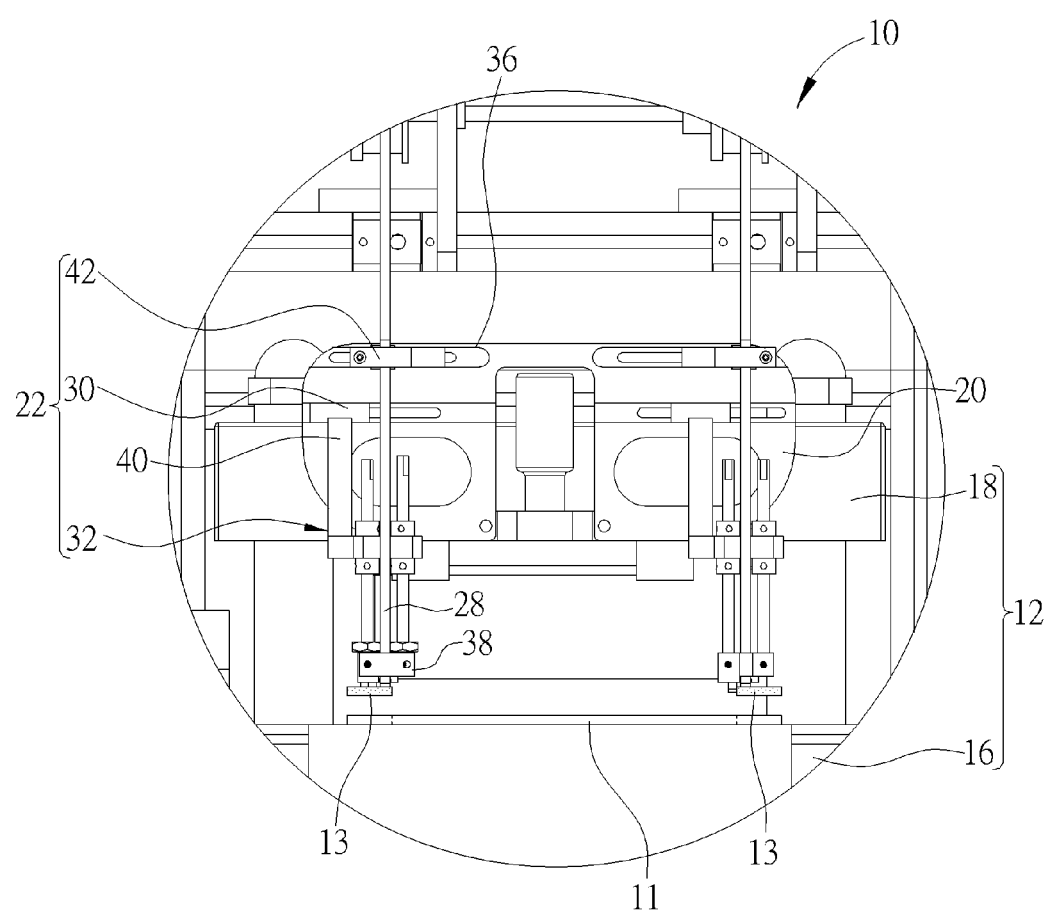
FIG. 4 is a partial enlarged diagram of the pressing-head end of the pressing-head device in FIG. 3 moving upward to make the film waste attached to a tape separate from the protection film.
Figure 5:
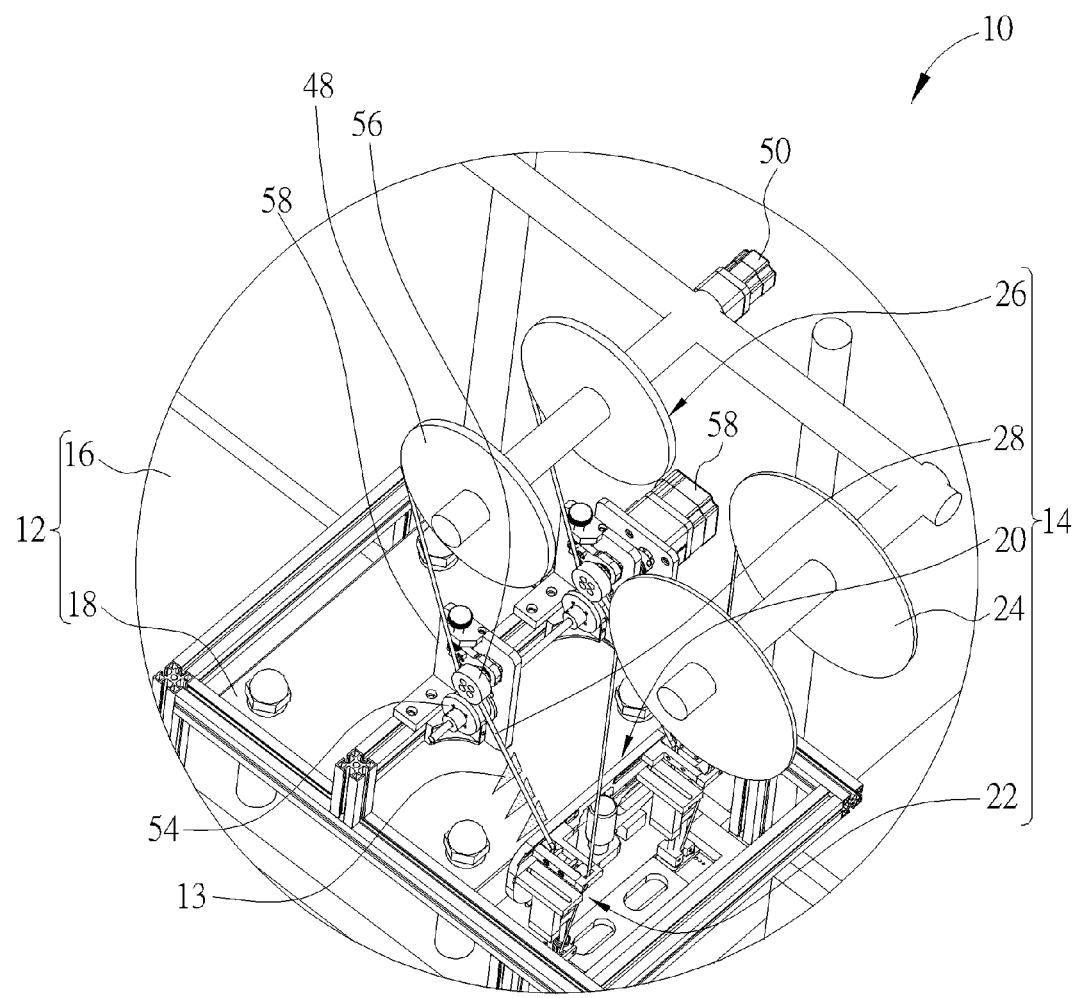
FIG. 5 is a partial enlarged diagram of a collection device in FIG. 1 reeling in the tape to make a portion of the tape attached to the film waste move toward a reeling plate.

The waste recycling operation of the film cutting module 10 is described in detail as follows. Please refer to FIG. 2, FIG. 3, FIG. 4, and FIG. 5. FIG. 3 is a partial enlarged diagram of the film cutting module 10 in FIG. 1 when the pressing-head end 38 of the pressing-head device 22 presses a film waste 13 of a protection film 11. FIG. 4 is a partial enlarged diagram of the pressing-head end 38 of the pressing-head device 22 in FIG. 3 moving upward to make the film waste 13 attached to the tape 28 separate from the protection film 11. FIG. 5 is a partial enlarged diagram of the collection device 26 in FIG. 1 reeling in the tape 28 to make a portion of the tape 28 attached to the film waste 13 move toward the reeling plate 48. Via the aforesaid design, when the fixing plate 20 moves downward with the cutting motion of the cutting template 18, the pressing-head device 22 disposed on the fixing plate 20 could move downward to make the pressing-head end 38 press the film waste 13 of the protection film 11, so as to make the tape 28 wound on the pressing-head end 38 attached to the film waste 13 (as shown in FIG. 3). To be noted, during the aforesaid process, no matter the film waste 13 is formed on a central region or other position on the protection film 11 (e.g. a side or a corner of the protection film 11), the pressing-head device 22 could move relative to the fixing plate 20 via the aforesaid biaxial moving design to make the pressing-head end 38 aligned with the film waste 13 by a conventional aligning method (e.g. an automatic aligning method or a manual aligning method), so as to make the pressing-head end 38 press the film waste 13 precisely with downward movement of the pressing-head device 22.

Subsequently, when the fixing plate 20 moves upward with the cutting motion of the cutting template 18, the pressing-head device 22 disposed on the fixing plate 20 could move upward accordingly, to make the film waste 13 attached to the tape 28 separate from the protection film 11 with upward movement of the pressing-head end 38 (as shown in FIG. 4). After the aforesaid process is completed, the collection device 26 could utilize the second motor 58 to rotate the driving pulley 54 to reel in the portion of the tape 28 having the film waste 13 cooperatively with the driven pulley 56, so that the portion of the tape 28 having the film waste 13 could move toward the reeling plate 48 (as shown in FIG. 5). Accordingly, the portion of the tape 28 having the film waste 13 could be separate from the pressing-head end 38 of the pressing-head device 22, and a portion of the tape 28 without any film waste could be wound on the pressing-head end 38 of the pressing-head device 22 for the pressing-head end 38 to perform the subsequent waste attaching operation. After the collection device 26 utilizes the first motor 50 to rotate the reeling plate 48 to reel in the portion of the tape 28 having the film waste 13 on the reeling plate 48, the waste recycling operation of the film cutting module 10 could be completed in an automated manner.

Compared with the prior art utilizing a tape to remove film wastes manually, the present invention adopts the design in which the pressing-head device having the tape wound thereon could move upward and downward with the cutting motion of the cutting template and the collection device could reel in the portion of the tape having the film waste attached thereto, to make the film waste separate from the protection film and then reeled on the collection device for achieving the purpose that the film cutting module could complete the waste recycling operation quickly. In such a manner, the present invention could greatly simplify the waste recycling process and solve the prior art problem that a protection film could be torn apart by accident or tape marks could be formed on the protection film during a tape tearing-off process, so as to efficiently improve the cutting efficiency and quality of the film cutting machine.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A waste recycling mechanism disposed on a film cutting machine for performing a waste recycling operation of the film cutting machine, the film cutting machine comprising a cutting template and a platform, the cutting template being movably disposed on the platform for moving upward and downward relative to the platform and performing a cutting motion, the waste recycling mechanism comprising:
    a fixing plate fixed on the cutting template for moving upward and downward with the cutting motion of the cutting template;
    at least one pressing-head device disposed on the fixing plate;
    a tape reel disposed on the platform;
    a collection device disposed on the platform;
    a tape wound on the tape reel and connected to the collection device after being wound on the at least one pressing-head device, the at least one pressing-head device moving downward to press a film waste on a protection film for making the tape attached to the film waste when the fixing plate moves downward with the cutting motion of the cutting template, and when the fixing plate moves upward with the cutting motion of the cutting template, the at least one pressing-head device moving upward to separate the film waste attached to the tape from the film and the collection device reeling in the tape to make a portion of the tape having the film waste attached thereto separate from the at least one pressing-head device and make a portion of the tape without any film waste wound on the pressing-head device.

2. The waste recycling mechanism of claim 1, wherein the at least one pressing-head device comprises:
    a slot arm portion protruding from the fixing plate and having a first guide slot;
    a pressing-head arm portion having a pressing-head end and a block end, the tape being wound on the pressing-head end, the block end being movably inserted into the first guide slot so that the block end could move along the first guide slot in a first direction to make the pressing-head end aligned with the film waste.

3. The waste recycling mechanism of claim 2, wherein the fixing plate has a second guide slot formed thereon, and the slot arm portion is movably inserted into the second guide slot so that the slot arm portion could move along the second guide slot in a second direction to make the pressing-head end aligned with the film waste.

4. The waste recycling mechanism of claim 2, wherein the at least one pressing-head device further comprises:
    a guide pulley frame protruding from the fixing plate and having a first pulley portion and a second pulley portion for guiding the tape to pass through the first pulley portion to be wound on the pressing-head end and then pass through the second pulley portion to be connected to the collection device.

5. The waste recycling mechanism of claim 2, wherein the pressing-head end is made of silicone rubber material.

6. The waste recycling mechanism of claim 1, wherein the collection device comprises:
    a reeling plate connected to the tape; and
    a first motor axially pivoted to the reeling plate for rotating the reeling plate so as to reel in the portion of the tape having the film waste.

7. The waste recycling mechanism of claim 6, wherein the first motor is a torque motor.

8. The waste recycling mechanism of claim 6, wherein the collection device further comprises:
    a board;
    a driving pulley rotatably disposed on the board;
    a driven pulley rotatably disposed on the board for clamping the tape cooperatively with the driving pulley; and
    a second motor axially pivoted to the driving pulley for rotating the driving pulley to reel in the tape cooperatively with the driven pulley so as to make the portion of the tape having the film waste move toward the reeling plate.

9. The waste recycling mechanism of claim 8, wherein the second motor is an adjustable speed motor.

10. A film cutting module comprising:
    a film cutting machine comprising:
        a platform; and
        a cutting template movably disposed on the platform for moving upward and downward relative to the platform and performing a cutting motion; and
    a waste recycling mechanism disposed on the film cutting machine, the waste recycling mechanism comprising:
        a fixing plate fixed on the cutting template for moving upward and downward with the cutting motion of the cutting template;
        at least one pressing-head device disposed on the fixing plate;
        a tape reel disposed on the platform;
        a collection device disposed on the platform; and
        a tape wound on the tape reel and connected to the collection device after being wound on the at least one pressing-head device, the at least one pressing-head device moving downward to press a film waste on a film for making the tape attached to the film waste when the fixing plate moves downward with the cutting motion of the cutting template, and when the fixing plate moves upward with the cutting motion of the cutting template, the at least one pressing-head device moving upward to separate the film waste attached to the tape from the film and the collection device reeling in the tape to make a portion of the tape having the film waste attached thereto separate from the at least one pressing-head device and make a portion of the tape without any film waste wound on the pressing-head device.

11. The film cutting module of claim 10, wherein the at least one pressing-head device comprises:
    a slot arm portion protruding from the fixing plate and having a first guide slot;
    a pressing-head arm portion having a pressing-head end and a block end, the tape being wound on the pressing-head end, the block end being movably inserted into the first guide slot so that the block end could move along the first guide slot in a first direction to make the pressing-head end aligned with the film waste.

12. The film cutting module of claim 11, wherein the fixing plate has a second guide slot formed thereon, and the slot arm portion is movably inserted into the second guide slot so that the slot arm portion could move along the second guide slot in a second direction to make the pressing-head end aligned with the film waste.

13. The film cutting module of claim 11, wherein the at least one pressing-head device further comprises:
   a guide pulley frame protruding from the fixing plate and having a first pulley portion and a second pulley portion for guiding the tape to pass through the first pulley portion so as to be wound on the pressing-head end and then pass through the second pulley portion to be connected to the collection device.

14. The film cutting module of claim 11, wherein the pressing-head end is made of silicone rubber material.

15. The film cutting module of claim 10, wherein the collection device comprises:
   a reeling plate connected to the tape; and
   a first motor axially pivoted to the reeling plate for rotating the reeling plate so as to reel in the portion of the tape having the film waste.

16. The film cutting module of claim 15, wherein the first motor is a torque motor.

17. The film cutting module of claim 15, wherein the collection device further comprises:
   a board;
   a driving pulley rotatably disposed on the board;
   a driven pulley rotatably disposed on the board for clamping the tape cooperatively with the driving pulley; and
   a second motor axially pivoted to the driving pulley for rotating the driving pulley to reel in the tape cooperatively with the driven pulley so as to make the portion of the tape having the film waste move toward the reeling plate.

18. The film cutting module of claim 17, wherein the second motor is an adjustable speed motor.

* * * * *